US006758936B1

(12) United States Patent
Kiekhaefer et al.

(10) Patent No.: US 6,758,936 B1
(45) Date of Patent: Jul. 6, 2004

(54) LENTICULAR LENS CARD AND METHOD FOR MANUFACTURING

(75) Inventors: John H. Kiekhaefer, Bloomingdale, IL (US); Jachin Wang, Des Plaines, IL (US); Dale Mitchell Pfingst, Aurora, IL (US); Susan Green, Wilmington, DE (US); George McGonigle, Thorofare, NJ (US); Philip P. Jordan, Oswego, IL (US)

(73) Assignee: MBNA America Bank, N.A., Wilmington, DE (US)

( * ) Notice: Subject to any disclaimer, the term of this patent is extended or adjusted under 35 U.S.C. 154(b) by 234 days.

(21) Appl. No.: 09/921,881

(22) Filed: Aug. 6, 2001

Related U.S. Application Data

(63) Continuation-in-part of application No. 09/295,600, filed on Apr. 22, 1999, now Pat. No. 6,277,232.

(51) Int. Cl.[7] .......................... B41M 3/14; B32B 31/20; B32B 31/04; B42D 15/10; B42D 15/00

(52) U.S. Cl. .................... 156/277; 156/308.2; 156/250; 156/289; 156/327; 283/70; 283/75; 283/94; 427/162

(58) Field of Search ................................. 156/250, 277, 156/327, 308.2, 583.1, 289; 283/70, 75, 82, 94, 109; 427/162, 165.2, 163.4

(56) References Cited

U.S. PATENT DOCUMENTS

| | | | | |
|---|---|---|---|---|
| 5,944,356 A | | 8/1999 | Bergmann et al. | |
| 6,016,225 A | * | 1/2000 | Anderson | 359/619 |
| 6,073,854 A | * | 6/2000 | Bravenec et al. | 235/487 |
| 6,176,430 B1 | | 1/2001 | Finkelstein et al. | |
| 6,296,188 B1 | | 10/2001 | Kiekhaefer | |

FOREIGN PATENT DOCUMENTS

| | | | | |
|---|---|---|---|---|
| EP | 0323108 A2 | * | 7/1989 | B42D/15/02 |
| JP | 10-86568 | * | 4/1998 | B42D/15/10 |
| JP | 2000-298319 | * | 10/2000 | G03B/35/00 |

* cited by examiner

*Primary Examiner*—J. A. Lorengo
(74) *Attorney, Agent, or Firm*—Hunton & Williams LLP

(57) ABSTRACT

A secure plastic card and method for manufacturing the secure plastic card are disclosed. The secure plastic card includes a lenticular lens surface having a filmed image printed thereon. The lenticular lens surface is bonded to a core stock layer. The bonding is accomplished with an thermally bondable coating layer which is preferably capable of migrating through lithographic ink. The lenticular lens material and the core stock layer are assembled together and are laminated to form the secure plastic card. The exposed surface of the lenticular lens material is preferably covered with a temporary protective film during lamination.

21 Claims, 2 Drawing Sheets

LENTICULAR LENS CARD AND METHOD FOR MANUFACTURING

RELATED APPLICATION DATA

This application is a Continuation-In-Part Application of U.S. patent application Ser. No. 09/295,600, filed on Apr. 22, 1999now U.S. Pat No. 6,277,232.

BACKGROUND OF THE INVENTION

The present invention relates to a lenticular lens card such as a credit, charge, or debit card which permits viewing of multi-dimensional lithographic images and a process for manufacturing the plastic card. Using the appropriate process, a plastic card can be created which has artistic visual images creating the illusions of depth and moving effects imprinted therein. The process results in a plastic card that meets financial industry standards for security, reliability, and durability.

By way of background, there are many different types and styles of credit, charge, debit, and other financial cards made from plastic. Typically, a plastic card, such as a credit card, has one or two central layers of white or colored plastic. A clear plastic film is then laminated to the front and rear surfaces of the central plastic layer.

Additionally, there are known processes of producing multi-dimensional lithographic images which impart the illusions of depth and/or motion to a viewer. Typically, lithographic images are created by using a series of individual still pictures created from photographs or other artistic works which are segmented and then merged together in a desired sequence to form a composite picture or image. There are also known methods of segmenting and merging the individual pictures using a computer to convert the original artwork into electronic data, and to order and interface frames into sequence to form a composite image. It is further known that the composite image can be outputted to an imaging device which prints the image onto film and that the resulting film can be used to produce multiple prints of the composite image by transfer to a suitable substrate, such as paper stock. There are also various known processes of adhering to the paper stock lenticular lens material consisting of an array of identical cylindrically curved surfaces embossed on the front surface of a plastic sheet. The lenticular lens material refracts light from each image in sequence as the viewers angle of perception changes. The result is the perception of motion from a series of still images.

However, it has not been previously known how to manufacture a traditional plastic card such as used for a credit card which has a multidimensional, lithographic image viewed through lenticular lens material imprinted therein. The various materials could not be successfully adhered and/or laminated in a manner so that the resulting plastic card was durable enough to withstand typical wear and use for a prolonged period of time.

In order to create a secure credit card, it is desirable to create a "destructible" bond, which is a bond that is not separable without breakage or distortion. If a card is destroyed upon separation, it cannot easily be used to recreate a false card, thereby improving security. It is more difficult to create a secure bond in a lenticular card because of the relatively greater thickness of the layers in contact with the print. For instance, it is more difficult to achieve a destructible bond between 10–15 mil layers with printing between them than it is to achieve a destructible bond of a thin overlay of 1–2 mils to a printed surface as required in conventional cards. When two layers 10–15 mils thick are pulled apart, in addition to peel force, there is a sheer leverage available for splitting the two layers due to the stiffness of the materials. In contrast, when removing the flexible overlay film from a 10–15 mil rigid stock, no sheer forces are available.

Furthermore, the heat and pressure required for lamination can destroy the lenticular lens surface, thus resulting in a non-lenticular card. Thus, a method must be obtained for preserving the lenticular lens surface during lamination.

SUMMARY OF THE INVENTION

It is therefore an object of the present invention to provide a durable, long-lasting, and secure plastic card having a lenticular lens therein through which to view lithographic images, thereby imparting the illusions of depth and/or motion to the lithographic images.

In a first aspect, the invention comprises a lenticular lens plastic card having a sufficient bond strength between a plurality of layers to create a secure plastic card, the lenticular lens plastic card comprising: a first plastic layer having a first surface including a series of cylindrically shaped projections and a second substantially flat surface; a second plastic layer having a front surface and a rear surface; a lithographic print layer disposed between the substantially flat surface of the first plastic layer and the front surface of the second plastic layer; and at least one thermally bondable coating layer capable of migrating through the lithographic print layer for creating a bond between the substantially flat surface of the first plastic layer and the front surface of the second plastic layer. The migration occurs during a lamination involving heat and pressure.

In another aspect, the invention comprises a lenticular plastic card manufactured by a process comprising the steps of: providing a sheet of lenticular lens material having a first surface and a second surface, the first surface including a series of cylindrically shaped projections, and the second surface being substantially flat; printing the second surface with a filmed lithographic image; providing a plastic backing layer having a front surface facing the second surface of the lenticular lens material and a rear surface; providing a backing film over the rear surface of the plastic backing layer; coating the second surface of the lenticular lens material with a thermally bondable coating layer capable of migrating through the filmed lithographic image; assembling and collating the sheet of lenticular lens material, the plastic backing layer and the backing film, such that the first surface of the lenticular lens material is on a front side and the backing film is disposed on a rear side; providing a protective removable film over the first surface of the lenticular lens material, wherein the protective removable film has a softening point lower than a softening point of the lenticular lens material; and laminating the assembled, collated sheets with heat and pressure.

In a further aspect, the invention comprises a method for manufacturing a plastic card. The method comprises the steps of: providing a sheet of lenticular lens material having a first surface and a second surface, the first surface including a series of cylindrically shaped projections, and the second surface being substantially flat; printing the second surface with a filmed lithographic image; providing a plastic backing layer having a front surface facing the second surface of the lenticular lens material and a rear surface; providing a protective removable film over the first surface of the lenticular lens material, wherein the protective removable film has a softening point lower than a softening point of the lenticular lens material; providing a sheet of backing film over the rear surface of the plastic backing layer; assembling and collating the sheet of lenticular lens material with the protective removable film, the plastic backing layer, and the sheet of backing film; and laminating the assembled, collated sheets. In the aforementioned methods, lamination is preferably achieved through heat and pressure in a platen press.

In yet an additional aspect, the invention comprises a method for manufacturing a plastic card, the method comprising the steps of: providing a sheet of lenticular lens material having a first surface and a second surface, the first surface including a series of cylindrically shaped projections, and the second surface being substantially flat; printing the second surface with a filmed lithographic image; providing a plastic backing layer having a front surface facing the second surface of the lenticular lens material and a rear surface; providing a backing film over the rear surface of the plastic backing layer; coating the second surface of the lenticular lens material with an thermally bondable coating layer capable of migrating through the filmed lithographic image; assembling and collating the sheet of lenticular lens material, the plastic backing layer, and the backing film so that the first surface of the lenticular lens material is on a front side and the backing film is disposed on a rear side after assembly; providing a protective removable film over the first surface of the lenticular lens material, wherein the protective removable film has a softening point lower than a softening point of the lenticular lens material; and laminating the assembled, collated sheets through application of heat and pressure.

In yet a further aspect, the invention comprises a lenticular plastic card comprising: a lenticular lens material having a front side and a rear side, the front side having an array of identically curved surfaces embossed thereon, the rear side being flat and having a thermally bondable coating thereon and a print layer over the coating; a sheet of plastic having a front surface and a rear surface, wherein the rear surface includes printing; a sheet of clear PVC overlay film having a magnetic stripe laminated thereon, wherein the lenticular lens material, the sheet of plastic, and the sheet of clear PVC overlay film are laminated together such that the lenticular lens material is on a front side, the sheet of clear PVC overlay film is on a rear side, and the sheet of plastic is between the front side and the rear side.

The accompanying drawings, which are incorporated and constitute a part of this specification, illustrate preferred embodiments of the invention and, together with the description, serve to explain the principles of the invention.

DETAILED DESCRIPTION OF THE PREFERRED EMBODIMENTS

Figure 1:
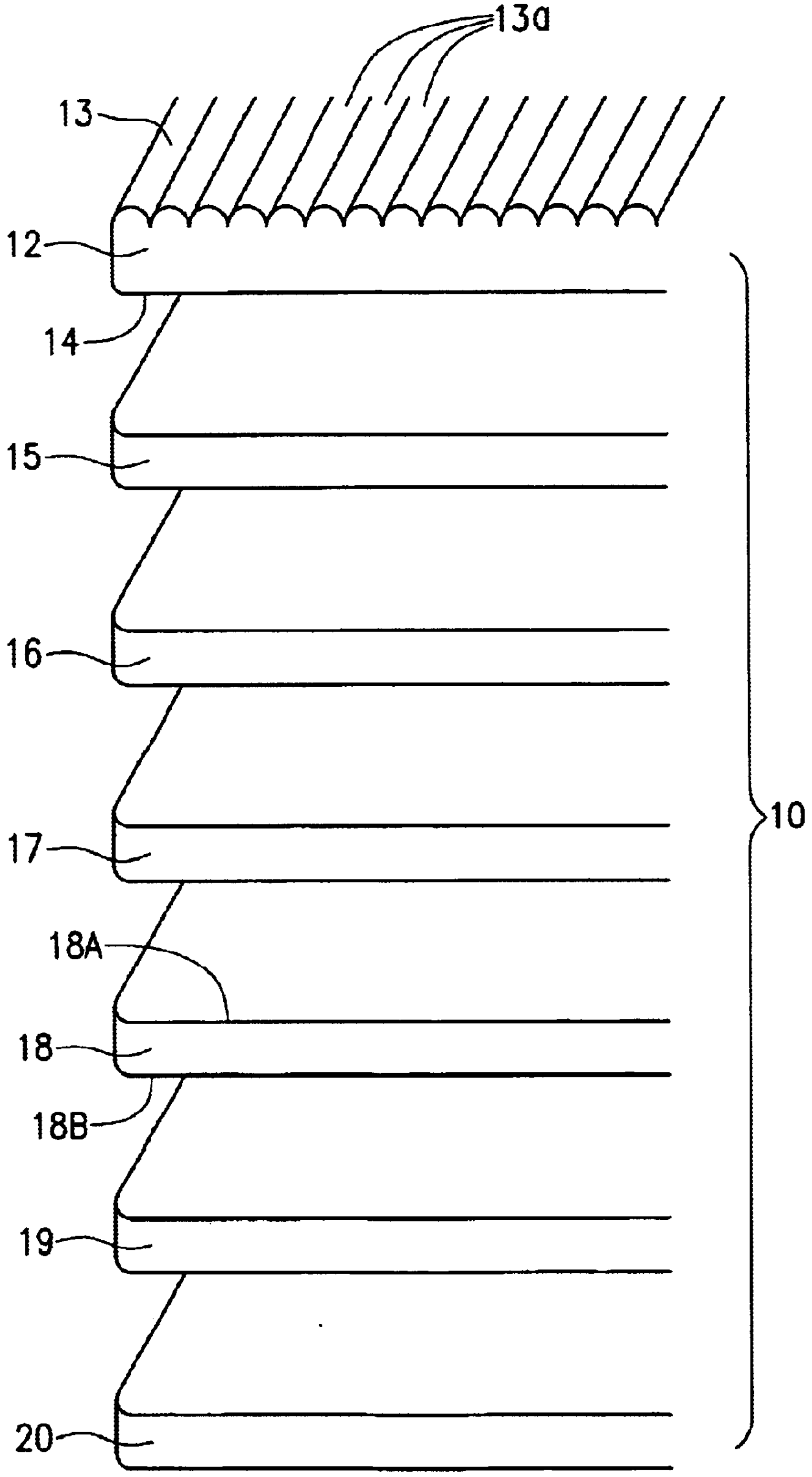
FIG. 1 is a cross-sectional view of the plastic card with lenticular lens of the present invention, showing the layers of materials used in manufacturing the card.

Reference will now be made in detail to the present preferred embodiments of the invention, an example of which is illustrated in the accompanying drawings in which like reference numerals refer to corresponding elements.

As shown in FIG. 1, a cross section of a plastic card 10 with a lenticular lens material 12 of the present invention is illustrated. The plastic card 10 of the present invention includes an upper layer of the lenticular lens material 12 preferably formed of clear PVC plastic. Other plastic material, such as PET plastic may also be used. The lenticular lens material 12 has an array of identical cylindrically curved surfaces 13*a* on a front side 13 and is flat on its back side 14. The array of identical cylindrically curved surfaces 13*a* is formed by using an engraved cylindrical roller that has been radially grooved, such that when a sheet of flat clear plastic lenticular lens material 12 is fed through the cylindrical roller, it produces the array of identical cylindrically curved surfaces 13*a* on the front side 13 of the clear plastic lenticular lens material 12. The identical cylindrically curved surfaces 13*a* are the "lenses" of the lenticular lens material 12. The clear plastic lenticular lens material 12 includes 75 to 125 lenses per lineal inch and has a thickness of 0.007–0.028 inches. Preferably, the clear plastic lenticular lens material 12 includes 100 lenses per lineal inch and is approximately 0.010 to 0.015 inches thick.

On the back side 14 of the lenticular lens material 12, a thermoplastic heat bondable coating 15 and an ink layer 16 are applied. The thermoplastic heat bondable coating 15 and the ink layer 16 may be applied to the back side 14 of the lenticular lens material 12 in any order. In one preferred embodiment, the ink layer 16 is a lithographic print layer. Furthermore, in one preferred embodiment, the thermoplastic heat bondable coating 15 is a vinyl resin coating.

A layer of core stock 18 is bonded to the backside 14 of the lenticular lens material 12 using the thermally bondable coating layer 15 and optionally using an additional thermally bondable coating layer 17. The thermally bondable coating layer 17 is capable of functioning in conjunction with the ink layer 16 and the thermally bondable coating layer 15 to form a bond in excess of 3.4 lb./in. This bond strength is difficult to achieve with lithographic print surfaces because the lithographic ink typically does not have the necessary cohesive strength to support such a bond. Accordingly, both the thermally bondable coating layer 15 and optionally thermally bondable coating layer 17 are selected so as to have the capability of migrating through the ink layer 16 to bond the lenticular lens material 12 to the layer of core stock 18.

The layer of core stock 18 is comprised of a white PVC plastic of between 0.003 inches and 0.023 inches and preferably approximately 0.0135 inches thick for use for use as a back side of the plastic card 10. This layer of core stock 18 is preferably opaque.

The thermally bondable coating layer or layers 15, 17 can be applied in a number of different ways. In one embodiment, the thermally bondable coating layer 15 is applied to the back side 14 of the lenticular lens material 12 prior to the ink layer 16. In another embodiment, the thermally bondable coating layer 17 is applied to the back side 14 of the lenticular lens material 12 prior to printing and to a surface of the core stock layer 18. In yet a further alternative embodiment, the thermally bondable coating layer 17 can be applied to the back side 14 of the lenticular lens material after ink layer 16. In a further alternative embodiment, a thermally bondable coating layer 15 is not applied to the back side 14, but rather is applied only to a surface of the core stock layer 18. All of the aforementioned embodiments result in a bond between the lenticular lens material 12 and the core stock layer 18 such that the thermally bondable coating layer(s) 15, 17 are capable of migrating through the print layer 16. Hereinafter, the thermally bondable coating material in all embodiments of the invention will be referenced as the "thermally bondable coating layer 15, 17", recognizing that this terminology encompasses either layer 15 or layer 17, or both layers 15 and 17 combined.

The thermally bondable coating layers 15 and 17 should be carefully selected so that they migrates through the lithographic print layer 16. In order to accomplish this goal, in one embodiment of the invention, thermally bondable coating layers 15 and 17 should soften and bond at a temperature below the 175–185 degree Fahrenheit softening point of the lenticular lens material 12. The lower softening point enables the bond to be achieved without any crushing or distortion of the lenticular lens material 12. In an alternative embodiment of the invention, if the lenticular lens material 12 is selected so that it transforms from a solid to a liquid at a temperature of 280–320 degrees Fahrenheit, the bond can be achieved with minimal distortion of the lenticular lens material 12 if the thermally bondable coating layer has a softening temperature of less than 280–320 degrees Fahrenheit. In either case, the thermally bondable coating layer 15, 17, softens and flows with rising temperatures so that it can permeate and migrate through the lithographic print layer 16, encapsulate it, and bond directly to the rear surface of the lenticular lens material 12 and the front surface of the core stock layer 18.

Accordingly, the thermally bondable coating layer 15, 17 can fall into either of two categories. It can soften at a temperature of less than 175–185 degrees Fahrenheit (the softening point of the lenticular lens material 12) or at a temperature of less than 280–320 degrees Fahrenheit (the temperature at which the lenticular lens material turns from solid to liquid). In the first case, the temperature of lamination can be chosen to eliminate distortion or crushing of the lenticular surface 13. An example of an thermally bondable coating layer that has a softening point in the identical range is 8783 PB Screening Metallic Mixing Clear, which is available from Polymeric Imaging Inc., of North Kansas City Mo. In the second case, with an thermally bondable coating layer having a softening temperature of less than 280–320 degrees Fahrenheit, lamination is kept at a temperature below this range to minimize distortion and crushing of the lenticular peaks. An example of an appropriate thermally bondable coating layer is Wink 807S Water Base Clear, available from Functional Materials Inc., of Sloatsburg, N.Y.

Another ink layer 19 may optionally be printed on the layer of core stock 18. A layer of PVC overlay (or "laminating") film 20 is placed over the printed layer of core stock 18. The PVC overlay film 20 is preferably approximately 0.002 inches thick. When fully constructed the plastic card 10 preferably has a thickness of between 0.027 inches and 0.033 inches.

In addition to the description provided above, a list of further possible embodiments is provided below. If only one thermally bondable layer is present, it is labeled as thermally bondable coating layer 15. If an additional thermally bondable coating layer is present, it is designated as thermally bondable coating layer 17.

| | Thermally Bondable Coating Layer 15 | Optional Thermally Bondable Coating Layer 17 |
|---|---|---|
| Option 1 | Between backside 14 of lenticular lens material 12 and ink layer 16, applied to backside 14 of lenticular lens material | No layer 17 |

-continued

| | Thermally Bondable Coating Layer 15 | Optional Thermally Bondable Coating Layer 17 |
|---|---|---|
| Option 2 | Between ink layer 16 and front side of core stock 18, applied to ink layer 16 | No layer 17 |
| Option 3 | Between ink layer 16 and front side of core stock 18, applied to front side of core stock 18 | No layer 17 |
| Option 4 | Between backside 14 of lenticular lens material 12 and ink layer 16, applied to backside 14 of lenticular lens material | Between ink layer 16 and layer of core stock 18, applied to ink layer 16 |
| Option 5 | Between backside 14 of lenticular lens material 12 and ink layer 16, applied to backside 14 of lenticular lens material | Between ink layer 16 and layer of core stock 18, applied to front side of core stock 18 |

Figure 2:
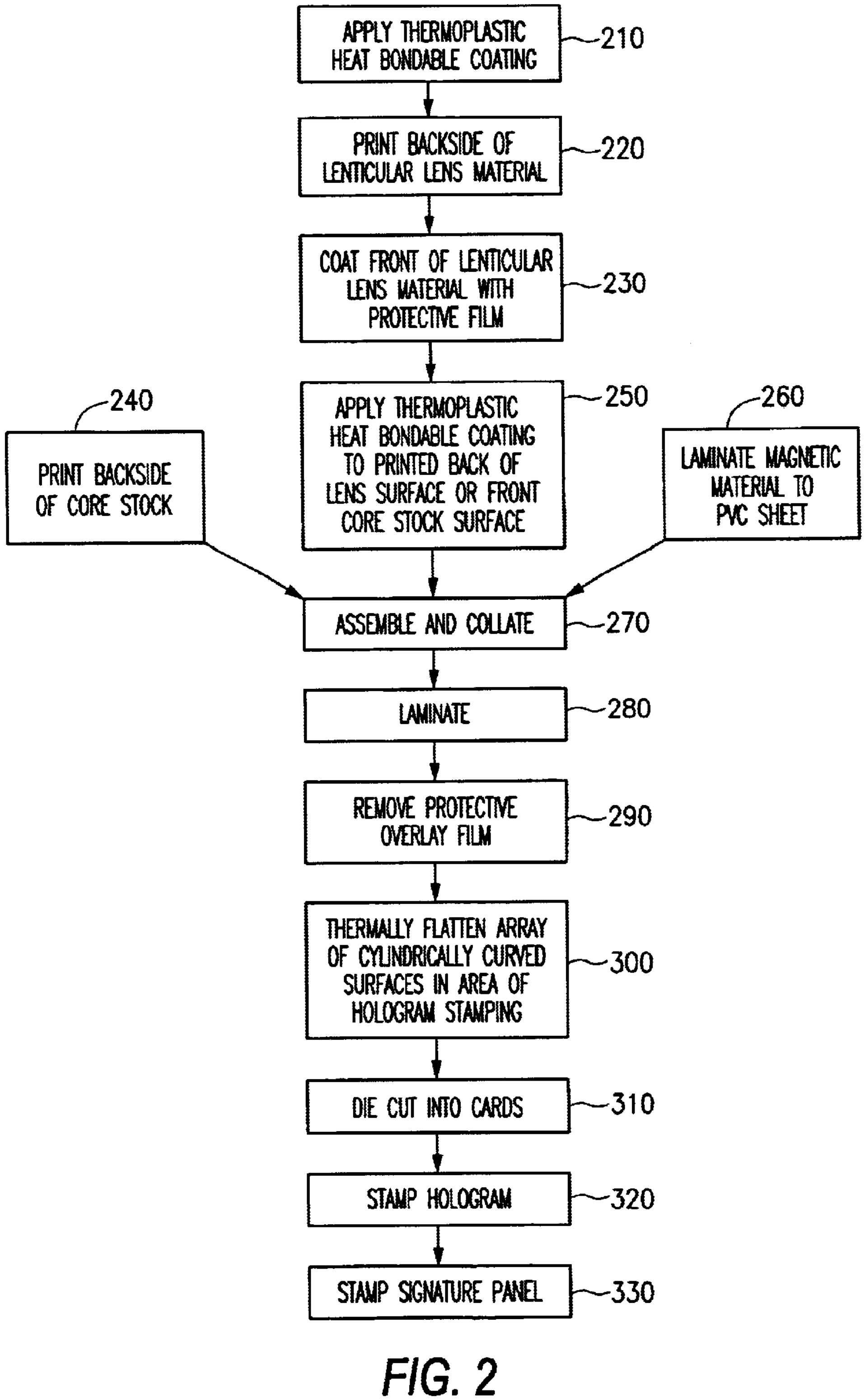
FIG. 2 is a flow diagram depicting the steps performed in the method of manufacturing the card of FIG. 1.

As shown in FIG. 2, the process 100 of manufacturing the plastic card 10 includes starting with a sheet of clear PVC plastic lenticular lens material approximately 0.014 inches in thickness and approximately 22.75 inches wide and 27.75 inches long with the array of identical cylindrically curved surfaces 13*a* or lenses on the front side 13 of the lenticular lens material 12. (It should be noted that sheets of lenticular lens material of any other width and length may also be used.) The process 100 then proceeds with step 210 wherein a thermoplastic heat bondable coating 15 is applied to the back side 14 of the lenticular lens material 12 using a Sakarai Cylinder Press. The application of the thermoplastic heat bondable coating 15 is performed through a process similar to silk screening. It should be noted that other machines comparable to the Sakarai Cylinder Press may also be used for this step 210. The thermally bondable coating layer 15 must be selected so that a bond strength between layers in excess of 3.4 lb./in. can be achieved. Accordingly, as described above, the selected thermally bondable coating layer 15 must be capable of migrating through the lithographic printing to bond with the back side 14 of the lenticular lens material 12 Both the back side 14 of the lenticular lens material 12 and the side 18*a* of the layer of core stock 18, which will contact the back side 14, may be coated with the thermally bondable coating layer 15. Alternatively, either one of the sides 14 and 18*a* can be coated.

Step 220 comprises printing the back side 14 of the lenticular lens material 12 with a reverse image of a composite lithographic image previously saved on film. The term "imaged film" should be construed to incorporate technologies such as electrophotography, thermal transfer, ink jet, digital presses, and direct to plate technologies. The printing step 220 is preferably done in a stochastic printing format performed on offset lithography using a Heidelberg Four-color Press or other comparable machine, but it could be performed by any other applicable printing process such as letterpress or rotogravure printing. The ink layer 16 which is used to print the lithographic image is comprised of ultraviolet (UV) curable ink specially formulated for use on plastic. In step 220, it is critical that there is the proper registration of alignment of the lithographic image to be printed on the back side 14 with the array of cylindrically curved lenses 13*a* on the front side 13 of the lenticular lens material 12 in order to achieve the desired visual presentation of depth and/or motion of the lithographic image.

As described above, steps 210 and 220 may be performed in any order. In other words, the thermoplastic heat bondable coating 15 can be applied over the ink layer 16 or the ink layer 16 can be applied over the thermoplastic heat bondable coating 15.

Step 230 is shown as occurring after steps 210 and 220, but may actually occur in any order prior to a lamination step—(as described below). Step 230 involves coating the front side 13 of the lenticular lens material 12 with a removable protective removable film for protecting the lenticular lens material surface while heat and pressure are applied during lamination. The protective removable film is present only during manufacturing and is therefore not shown in FIG. 1. The protective removable film has a lower softening point than a softening point of the lenticular lens material 12 (which is typically 180° F.) such the protective removable film softens during lamination and flows between the array of cylindrically curved lenses 13 to help maintain the shape of the array of cylindrically curved lenses 13*a* when the lenticular lens material 12 softens. A support film (not shown) may also be applied to the protective removable film. The support film preferably has an approximate thickness of 3 mil and may be polyethylene film. The support film ensures that the protective removable film can be removed in one piece from the lens surface 13.

A preferred protective removable film is "Parafilm M®" manufactured by the American National Can Company of Chicago, Ill. The protective removable film is preferably approximately 3 mils thick and is a mixture of a wax and a polyethylene resin. In a lamination performed at 270° F. and at a pressure of 200–300 pounds per square inch, a lenticular retention of 85% has been achieved. The lenticular retention is indicated by surface roughness measurements. Specifically, a surface roughness measurement is taken before and after lamination. The ratio of the two measurements is an indication of the level of lenticular retention. An instrument such as a Mitufoyo SJ-201 surface roughness tester may be used. The 100 line lenticular lens material 12 surface has a surface roughness of 580 $\mu$In (micro-inches) before lamination and a roughness of 490 $\mu$In after lamination when Parafilm M® is used as the protective removable film to coat the lenticular lens material 12 surface. Without use of the Parafilm M® protective removable film, the surface roughness of the lenticular lens material 12 after lamination is less than 50 $\mu$In and the 3D visual effects of the printed lithographic image are destroyed. Other materials including thermoplastic elastomer films and latex films have proven to be useful as protective removable films for maintaining the shape of the array identical cylindrically curved surfaces 13*a*. The protective removable films are successful to the degree that they migrate into valleys between the cylindrically curved surfaces 13*a* before the lenticular lens material 12 softens.

As described above, in an embodiment of the invention, the lenticular material 12 generally has a softening point of between 175 and 185 degrees Fahrenheit, the protective removable film softens at lower temperatures of between approximately 100 and 175 degrees Fahrenheit. As the temperature rises in the lamination process, the protective removable film flows into the lenticular valleys and bridges the lenticular peaks so that the pressure of lamination does not crush the peaks once the vinyl softening point is reached. The protective removable film serves to equally distribute the pressure across the entire lenticular surface rather than having it applied to the lenticular peaks only.

After the coating steps 220 and 230 and the printing step 210 have been performed, steps 240, 250, and 260 can be performed concurrently. Step 240 comprises taking a sheet of white PVC plastic core stock 18 approximately 0.0135 inches in thickness and 22.75 inches wide by 27.75 inches long and having a front surface 18*a* and a rear surface 18*b*. (Again, the width and length of the sheet 18 may be varied). This layer of core stock 18 is used for the back side of the plastic card 10. The rear surface 18*b* is printed with the text which is to appear on the back side of the plastic card 10 preferably by an offset lithography process using a Heidelberg Two or Four-Color Press or other comparable machine. Again, this printing can also be done by other applicable printing processes. The ink layer 19 used for printing the text on the rear surface 18*b* is comprised of UV curable ink specially formulated for use on plastic.

Step 250 comprises providing an additional thermally bondable coating layer 17. As set forth above, this step is optional as the thermally bondable coating 15, 17 may be applied either as an individual layer or as two layers. The application of the thermally bondable coating layer 17 is performed using a silk-screening process with a Sakarai Cylinder Press or other comparable machine. The process is identical to that described above with reference to the thermally bondable coating layer 15.

Step 260 comprises providing a sheet of clear PVC overlay film 20 approximately 0.002 inches in thickness to which magnetic, ferrous oxide material is thermally laminated using a Louda TL-700 tapelayer or other comparable machine.

Following steps 240, 250, and 260 in step 270, the sheet of lenticular lens material 12 with the thermally bondable coating layer 15, 17, the layer of core stock 18, and the sheet of clear PVC overlay film 20 laminated with magnetic, ferrous oxide material are assembled and collated. This assembly step 270 includes ensuring the proper orientation of the sheets resulting from steps 240, 250, and 260. The sheet of lenticular lens material 12 is to be oriented on the top of the three sheets and the sheet of core stock 18 is to be oriented in the middle of the three sheets with the PVC overlay film 20 on the bottom or opposite side of core stock 18 from the lenticular lens material 12. The sheets 12 and 18 are manually placed onto a machine feed table. The machine feed table includes pneumatically activated clamps to grip the sides of the sheets and convey them into a Louda GM-400 collator machine or other comparable machine. The edges of the sheets of printed lenticular lens material 12 and printed core stock 18 are mechanically aligned with the edges of the sheet of clear PVC overlay film 20 which is fed continuously through the machine. Once sheets 12 and 18 are mechanically aligned with the sheet of clear PVC overlay film 20, there are four clamps which clamp together the four corners of the three sheets and with the application of heat, each clamp will tack weld the three sheets together with areas of weld of approximately 0.06 square inches each. The three sheets, being held together by the tack welds of the four corners, are transported through and out of the machine.

These assembled sheets are all laminated together in step 270 using a vertical, steam heated, multi-plated laminator to press the components together. In one embodiment, this lamination is performed at a temperature of approximately 270 degrees Fahrenheit while applying a pressure of approximately 200 pounds per square inch (PSI) for approximately 25–30 minutes. The combination of the elevated temperature and pressure applied in the lamination step 270 causes the materials in the layers of the sheets to soften and the thermally bondable coating layers between the layers to activate. At the end of the 25–30 minute heat cycle, cold water is introduced to the platens of the press while the pressure is maintained causing the laminated, assembled sheets to solidify and cool to room temperature.

In an alternative embodiment, low temperature lamination binds the layers. The lenticular surface retains its shape during lamination if lamination is conducted at a temperature below the softening point of the surface of the lenticular lens material 12. For instance, if the lenticular lens material 12 is a vinyl sheet having a softening point of 180° F., lamination at 170° F. will not alter the shape of the surface of the lenticular lens material 12. This technique is useful regardless of whether the array of identical cylindrically curved surfaces 13 is covered by a protective removable film during lamination.

In one embodiment, a protective removable film such as ParafilmM® covers the array of identical cylindrically curved surfaces 13*a*. A low temperature thermally bondable coating layer bonds the lenticular lens material 12 and the layer of core stock 18 after the ink layer 16 is applied. Lamination is achieved at 170° F., which is below the 180° F. softening point of the vinyl sheet of lenticular lens material 12. Using this technique, a lenticular retention of 96% has been achieved.

In step 290, the protective removable film is removed from the surface through any known process. As set forth above, removal is simplified by the inclusion of a support film, which facilitates separation of the film from the lenticular surface 13. Step 290 may be performed any time after lamination and prior to thermal flattening in step 300. In step 300 the array of identical cylindrically curved surfaces 13*a* is thermally flattened in the area where a hologram is to be stamped. This area is on the front surface of the array of cylindrically curved surfaces 13*a* of lenticular lens material 12. Thermal flattening is accomplished by hoststamping the surface 13 with a releasable polyester film.

In step 310, the laminated, and assembled sheet resulting from step 280 is die cut into a plurality of individual cards 10 using a Louda DC 506 die cut machine or other comparable machine. The machine uses a multi-cavity, progressive shearing action, punch and die set. Each laminated assembled sheet may have 12 rows and 6 columns and once die cut should produce 72 individual plastic cards 10. The cards are preferabably 2.125 inches in one dimension and 3.375 inches in another dimension.

After the completion of step 310, step 320 is performed wherein a hologram is stamped onto the designated area on the front of each card 10 utilizing a Franklin-Louda 190 hot stamp machine or other comparable machine. These hot stamp machines utilize a heated die at a temperature of 340 degrees Fahrenheit and pressure to thermally affix foil material for a hologram onto the plastic card 10. The hologram serves as a security feature protecting against counterfeit cards. Next, step 330 is performed wherein a signature panel is hot-stamped onto the rear of plastic card 10. The plastic card 10 is considered complete at this point and is ready for shipment to a card processor for encoding with unique user information and embossing.

When the plastic card 10 is completely fabricated, a user of the plastic card 10 viewing the composite lithographic image imprinted in the card through the top surface 13 of the lenticular lens material 12, depending upon the image imprinted, can perceive the illusion that the image is moving if the plastic card 10 is rotated slightly and/or can perceive that the image has the appearance of being three-dimensional.

The plastic card 10 with lenticular lens of this invention when manufactured using the method described herein will conform to the standards of the International Organization of Standardization (ISO)/International Electrotechnical Commission (ICE) applicable to plastic financial cards. Moreover, use of the method for manufacturing the plastic card 10 of the present invention will result in a card having a high level of durability, security, and reliability, while allowing the user to view pleasing lithographic images contained therein.

In summary, at least two inventive features have been disclosed and the features are preferably used in combination to create a secure lenticular card. The first inventive feature is the use of a migratable thermally bondable coating layer having a pre-selected softening temperature as desired above. The second inventive feature is the use of a flowable protective film (such as Parafilm M) to redistribute lamination pressure across the entire lenticular surface.

The aforementioned features work together to achieve a secure bond while preserving lenticular shape. Using either feature without the other would have less desirable results. Even at low lamination temperatures (110–180 degrees Fahrenheit) much of the lenticular lens shape may be destroyed without the protective overlay film. Lamination pressure alone can crush the lenticular shape with very little softening of the lenticular lens material. Likewise, without the low softening temperature of the thermally bondable coating layer, lamination temperatures of 280–320 degrees Fahrenheit would be required to achieve a secure bond between the lenticular lens material 12 and the core stock layer 18. At these temperatures, significant loss of the lenticular shape would likely occur even with the use of a protective film.

It will be apparent to those skilled in the art that various modifications and variations can be made to the method of the present invention without departing from the scope or spirit of the invention. Thus, it is intended that the present invention cover the modifications and variations of this invention provided they come within the scope of the appended claims and their equivalents.

What is claimed is:

1. A method for manufacturing a plastic card, the method comprising the steps of:

providing a sheet of lenticular lens material having a first surface and a second surface, the first surface including a series of cylindrically shaped projections, and the second surface being substantially flat;

printing the second surface with a filmed lithographic image;

providing a plastic backing layer having a front surface facing the second surface of the lenticular lens material and a rear surface;

providing a protective removable film over the first surface of the lenticular lens material, wherein the protective removable film has a softening point lower than a softening point of the lenticular lens material;

providing a sheet of backing film over the rear surface of the plastic backing layer;

assembling and collating the sheet of lenticular lens material with the protective removable film, the plastic backing layer, and the sheet of the backing film; and laminating the assembled, collated sheets with heat and pressure.

2. The method of claim 1, wherein the laminating step further comprises laminating at a temperature between approximately 260 degrees Fahrenheit and 280 degrees Fahrenheit at a pressure of approximately 200 pounds per square inch to 300 pounds per square inch for approximately 15 to 30 minutes in a platen press.

3. The method of claim 1, wherein the laminating step further comprises laminating at a temperature of between approximately 150 degrees Fahrenheit and 180 degrees Fahrenheit at a pressure of approximately 200 pounds per square inch to 300 pounds per square inch for approximately 15 to 30 minutes in a platen press.

4. The method of claim 1, wherein the protective removable film comprises a wax/polyethylene resin mixture.

5. The method of claim 1, further comprising the step of coating the second surface of the lenticular lens material with at least one thermoplastic heat bondable coating.

6. The method of claim 5, wherein the thermoplastic heat bondable coating has a softening temperature between about 260 F and 280 F and the laminating step comprises laminating at a temperature between approximately 260 F and 280 F.

7. The method of claim 5, wherein the thermoplastic heat bondable coating has a softening temperature between about 150 F and 180 F and the laminating step comprises laminating at between approximately 150 F and 180 F.

8. The method of claim 5, wherein the step of coating the second surface is performed prior to the printing step.

9. The method of claim 5, wherein the step of coating the second surface is performed after the printing step.

10. The method of claim 5, wherein the thermoplastic heat bondable coating is a vinyl resin.

11. The method of claim 1, further comprising the step of coating the second surface of the lenticular lens material with an thermally bondable coating layer capable of migrating through the filmed lithographic image.

12. The method of claim 1, further comprising the step of flattening a portion of the first surface of the lenticular lens material by hotstamping the first surface with a releasable polyester film.

13. The method of claim 12, further comprising the step of hotstamping a foil hologram to the flattened portion of the first surface.

14. A method for manufacturing a plastic card, the method comprising the steps of:

providing a sheet of lenticular lens material having a first surface and a second surface, the first surface including a series of cylindrically shaped projections, and the second surface being substantially flat;

printing the second surface with a filmed lithographic image;

providing a plastic backing layer having a front surface facing the second surface of the lenticular lens material and a rear surface;

providing a backing film over the rear surface of the plastic backing layer;

bonding the second surface of the lenticular lens material to the front surface of the plastic backing layer with an thermally bondable coating layer capable of migrating through the filmed lithographic image;

assembling and collating the sheet of lenticular lens material, the plastic backing layer and the backing film, such that the first surface of the lenticular lens material is on a front side and the backing film is disposed on a rear side;

providing a protective removable film over the first surface of the lenticular lens material, wherein the protective removable film has a softening point lower than a softening point of the lenticular lens material; and laminating the assembled, collated sheets with heat and pressure.

15. The method of claim 14, wherein the laminating step further comprises laminating at a temperature between approximately 260 degrees Fahrenheit and 280 degrees Fahrenheit at a pressure of approximately 200 pounds per square inch to 300 pounds per square inch for 15 to 30 minutes in a platen press.

16. The method of claim 14, wherein the protective removable film comprises a wax/polyethylene resin mixture.

17. The method of claim 14, further comprising the step of coating the second surface of the lenticular lens material with a thermoplastic heat bondable coating.

18. The method of claim 17, wherein the step of coating the second surface is performed prior to the printing step.

19. The method of claim 17, wherein the step of coating the second surface is performed after the printing step.

20. The method of claim 17, wherein the thermoplastic heat bondable coating is a vinyl resin.

21. The method of claim 14, further comprising the step of flattening a portion of the first surface of the lenticular lens material by hotstamping the portion of the first surface with a releasable polyester film.

* * * * *